(12) United States Patent
Wuidart et al.

(10) Patent No.: US 7,058,357 B1
(45) Date of Patent: Jun. 6, 2006

(54) SIZING OF AN ELECTROMAGNETIC TRANSPONDER SYSTEM FOR AN OPERATION IN EXTREME PROXIMITY

(75) Inventors: Luc Wuidart, Fourrieres (FR); Jean-Pierre Enguent, Saint Savournin (FR)

(73) Assignee: STMicroelectronics S.A., Gentilly (FR)

( * ) Notice: Subject to any disclaimer, the term of this patent is extended or adjusted under 35 U.S.C. 154(b) by 149 days.

(21) Appl. No.: 09/615,430

(22) Filed: Jul. 13, 2000

(30) Foreign Application Priority Data

Jul. 20, 1999 (FR) .................................. 99 09563

(51) Int. Cl.
*H04B 5/00* (2006.01)

(52) U.S. Cl. .................. 455/41.1; 340/10.1; 340/572.1

(58) Field of Classification Search ................ 455/41, 455/151.2, 575, 95, 66, 274, 277.1, 73, 41.1, 455/575.1, 66.1; 342/51; 340/10.1, 10.4, 340/10.51, 572.1
See application file for complete search history.

(56) References Cited

U.S. PATENT DOCUMENTS

| | | | |
|---|---|---|---|
| 2,411,555 A | 11/1946 | Rogers | |
| 3,618,089 A | 11/1971 | Moran, Jr. et al. | |
| 4,068,232 A | 1/1978 | Meyers et al. | |
| 4,209,783 A | 6/1980 | Ohyama et al. | |
| 4,258,348 A | 3/1981 | Belfer et al. | |
| 4,278,977 A | 7/1981 | Nossen | |
| 4,375,289 A | 3/1983 | Schmall et al. | |
| 4,408,185 A | 10/1983 | Rasmussen | |
| 4,593,412 A | 6/1986 | Jacob | |
| 4,656,472 A | 4/1987 | Walton | |
| 4,660,192 A | 4/1987 | Pomatto, Sr. | |
| 4,673,932 A | 6/1987 | Ekchian et al. | |
| 4,706,050 A | 11/1987 | Andrews | |
| 4,782,308 A | 11/1988 | Trobec et al. | ................. 331/65 |
| 4,802,080 A | 1/1989 | Bossi et al. | |
| 4,814,595 A | 3/1989 | Gilboa | |
| 4,827,266 A | 5/1989 | Sato et al. | |
| 4,928,108 A | 5/1990 | Kropielnicki et al. | |
| 4,963,887 A | 10/1990 | Kawashima et al. | |
| 5,013,898 A | 5/1991 | Glasspool | ................... 235/449 |
| 5,055,853 A | 10/1991 | Garnier | |
| 5,084,699 A * | 1/1992 | DeMichele | .............. 340/10.34 |
| 5,099,227 A | 3/1992 | Geiszler et al. | |
| 5,126,749 A | 6/1992 | Kaltner | |
| 5,142,292 A | 8/1992 | Chang | |
| 5,202,644 A | 4/1993 | Brady | |
| 5,214,409 A | 5/1993 | Beigel | |

(Continued)

FOREIGN PATENT DOCUMENTS

DE        28 35 549 A1        3/1979

(Continued)

OTHER PUBLICATIONS

French Search Report from French Patent Application 99 09563, filed Jul. 20, 1999.

(Continued)

*Primary Examiner*—Marsha D. Banks-Harold
*Assistant Examiner*—Nghi H. Ly
(74) *Attorney, Agent, or Firm*—Lisa K. Jorgenson; Daniel P. McLoughlin; Wolf, Greenfield & Sacks, P.C.

(57) ABSTRACT

A system of contactless electromagnetic transmission between a terminal including a series oscillating circuit for generating an electromagnetic field and a transponder including a parallel oscillating circuit, these oscillating circuits being sized so that the coupling coefficient between them strongly decreases when the distance separating the transponder from the terminal becomes greater than a predetermined value.

30 Claims, 1 Drawing Sheet

U.S. PATENT DOCUMENTS

| | | | |
|---|---|---|---|
| 5,305,008 A | 4/1994 | Turner et al. | |
| 5,324,315 A | 6/1994 | Grevious | |
| 5,452,344 A | 9/1995 | Larson | |
| 5,493,267 A | 2/1996 | Ahlse et al. | |
| 5,504,485 A | 4/1996 | Landt et al. | |
| 5,519,381 A | 5/1996 | Marsh et al. | |
| 5,521,602 A | 5/1996 | Carroll et al. | |
| 5,525,993 A * | 6/1996 | Pobanz et al. | 342/51 |
| 5,541,604 A | 7/1996 | Meier | |
| 5,550,536 A | 8/1996 | Flaxl | |
| 5,604,411 A | 2/1997 | Venkitasubrahmanian et al. | |
| 5,619,529 A * | 4/1997 | Fujioka | 375/219 |
| 5,621,411 A | 4/1997 | Hagl et al. | |
| 5,691,605 A | 11/1997 | Xia et al. | |
| 5,698,837 A | 12/1997 | Furuta | |
| 5,698,838 A | 12/1997 | Yamaguchi | |
| 5,701,121 A | 12/1997 | Murdoch | |
| 5,703,573 A | 12/1997 | Fujimoto et al. | |
| 5,767,503 A | 6/1998 | Gloton | |
| 5,801,372 A | 9/1998 | Yamaguchi | |
| 5,831,257 A | 11/1998 | Yamaguchi | |
| 5,850,416 A | 12/1998 | Myer | |
| 5,874,725 A | 2/1999 | Yamaguchi | |
| 5,883,582 A | 3/1999 | Bowers et al. | |
| 5,889,273 A | 3/1999 | Goto | |
| 5,905,444 A | 5/1999 | Zimmer | |
| 5,955,950 A | 9/1999 | Gallagher, III et al. | |
| 6,014,088 A | 1/2000 | Van Santbrink et al. | |
| 6,025,780 A | 2/2000 | Bowers et al. | |
| 6,028,503 A | 2/2000 | Preishuberpflugl et al. | |
| 6,034,640 A | 3/2000 | Oida et al. | |
| 6,070,803 A | 6/2000 | Stobbe | |
| 6,070,804 A | 6/2000 | Miyamoto | |
| 6,072,383 A | 6/2000 | Gallagher, III et al. | |
| 6,075,491 A | 6/2000 | Dakeya et al. | |
| 6,100,788 A * | 8/2000 | Frary | 340/10.1 |
| 6,137,411 A | 10/2000 | Tyren | |
| 6,150,986 A | 11/2000 | Sandberg et al. | |
| 6,154,635 A | 11/2000 | Ohta | |
| 6,172,608 B1 | 1/2001 | Cole | |
| 6,208,235 B1 | 3/2001 | Trontelj | |
| 6,229,443 B1 | 5/2001 | Roesner | |
| 6,243,013 B1 | 6/2001 | Duan et al. | |
| 6,265,962 B1 | 7/2001 | Black et al. | |
| 6,272,320 B1 | 8/2001 | Nandra et al. | |
| 6,272,321 B1 | 8/2001 | Bruhnke et al. | |
| 6,281,794 B1 * | 8/2001 | Duan et al. | 340/572.1 |
| 6,304,169 B1 | 10/2001 | Blama et al. | |
| 6,307,468 B1 | 10/2001 | Ward, Jr. | |
| 6,307,517 B1 | 10/2001 | Lee | |
| 6,335,665 B1 | 1/2002 | Mendelsohn | |
| 6,356,738 B1 * | 3/2002 | Schneider et al. | 455/41.2 |
| 6,393,045 B1 | 5/2002 | Belcher et al. | |
| 6,424,820 B1 * | 7/2002 | Burdick et al. | 455/41 |
| 6,441,804 B1 | 8/2002 | Hsien | |
| 6,446,049 B1 | 9/2002 | Janning et al. | |
| 6,491,230 B1 | 12/2002 | Dubost et al. | |
| 6,498,923 B1 | 12/2002 | Ikefuji et al. | |
| 6,646,543 B1 | 11/2003 | Mardinian et al. | |
| 6,650,226 B1 | 11/2003 | Wuidart et al. | |
| 6,650,227 B1 | 11/2003 | Bradin | |
| 6,650,229 B1 | 11/2003 | Wuidart et al. | |
| 6,654,466 B1 | 11/2003 | Ikefuji et al. | |
| 6,690,229 B1 | 2/2004 | Rudolph | |
| 6,703,921 B1 | 3/2004 | Wuidart et al. | |
| 2002/0008611 A1 | 1/2002 | Wuidart | |
| 2003/0227323 A1 | 12/2003 | Enguent | |

FOREIGN PATENT DOCUMENTS

| | | |
|---|---|---|
| DE | 44 44 984 | 12/1994 |
| DE | 195 46 928 | 6/1997 |
| DE | 196 21 076 | 11/1997 |
| DE | 196 32 282 A1 | 2/1998 |
| EP | 0 038 877 | 11/1981 |
| EP | 0 369 622 | 5/1990 |
| EP | 0 568 067 A | 11/1993 |
| EP | 0 579 332 A1 | 1/1994 |
| EP | 0 645 840 A | 3/1995 |
| EP | 0 768 540 | 4/1997 |
| EP | 0 857 981 A1 | 8/1998 |
| EP | A-0 902 475 | 3/1999 |
| FR | 2 114 026 | 6/1972 |
| FR | 2 746 200 | 9/1997 |
| FR | 2 757 952 | 7/1998 |
| GB | 2 298 553 A | 9/1996 |
| GB | 2 321 726 A1 | 8/1998 |
| JP | 407245946 A * | 9/1995 |
| JP | 10-145267 | 5/1998 |
| JP | 10-203066 | 8/1998 |
| WO | WO 93/17482 | 9/1993 |
| WO | WO 98/20363 | 5/1998 |
| WO | WO 99/33017 | 7/1999 |
| WO | WO 99/43096 | 8/1999 |

OTHER PUBLICATIONS

French Search Report from French Patent Application No. 98 08025, filed Jun. 22, 1998.

French Search Report from French Patent Application No. 99 04547, filed Apr. 7, 1999.

French Search Report from French Patent Application No. 99 04546, filed Apr. 7, 1999.

French Search Report from French Patent Application No. 98 08024, filed Jun. 22, 1998.

French Search Report from French Patent Application No. 99 04548, filed Apr. 7, 1999.

French Search Report from French Patent Application No. 99 04544, filed Apr. 7, 1999.

French Search Report from French Patent Application No. 00/01214, filed Jan. 31, 2000.

French Search Report from French Patent Application No. 99 09564, filed Jul. 20, 1999.

French Search Report from French Patent Application No. 00/06301, filed May 17, 2000.

French Search Report from French Patent Application No. 99 04548, filed Apr. 7, 1999.

French Search Report from French Patent Application No. 99 04545, filed Apr. 7, 1999.

French Search Report from French Patent Application No. 99 07024, filed May 31, 1999.

French Search Report from French Patent Application No. 00 06302, filed May 17, 2000.

French Search Report from French Patent Application No. 00 06065, filed May 12, 2000.

French Search Report from French Patent Application No. 00 06061, filed May 12, 2000.

French Search Report from French Patent Application No. 00 06064, filed May 12, 2000.

French Search Report from French Patent Application No. 00 06071, filed May 12, 2000.

French Search Report from French Patent Application No. 99 04549, filed Apr. 7, 1999.

* cited by examiner

SIZING OF AN ELECTROMAGNETIC TRANSPONDER SYSTEM FOR AN OPERATION IN EXTREME PROXIMITY

BACKGROUND OF THE INVENTION

1. Field of the Invention

The present invention relates to systems using electromagnetic transponders, that is, transceivers (generally mobile) capable of being interrogated in a contactless and wireless manner by a unit (generally fixed), called a read and/or write terminal. The present invention more specifically relates to transponders having no independent power supply. Such transponders extract the power supply required by the electronic circuits included therein from the high frequency field radiated by an antenna of the read/write terminal. The present invention applies to such transponders, be they read only transponders, that is, adapted to operate with a terminal only reading the transponder data, or read/write transponders, which contain data that can be modified by the terminal.

2. Discussion of the Related Art

Systems using electromagnetic transponders are based on the use of oscillating circuits including a winding forming an antenna, on the transponder side and also on the read/write terminal side. These circuits are intended to be coupled by a close magnetic field when the transponder enters the field of the read/write terminal.

FIG. 1 very schematically shows, in a simplified way, a conventional example of a data exchange system between a read/write terminal 1 and a transponder 10.

Generally, unit 1 is essentially formed of an oscillating circuit formed of an inductance L1 in series with a capacitor C1 and a resistor R1, between an output terminal 2 of an amplifier or antenna coupler (not shown) and a reference terminal 3 (generally, the ground). The antenna coupler belongs to a circuit 4 for controlling the oscillating circuit and exploiting received data including, among others, a modulator-demodulator and a microprocessor for processing the control signals and the data. In the example shown in FIG. 1, node 5 of connection of capacitor C1 with inductance L1 forms a terminal for sampling a data signal received from transponder 10 for the demodulator. Circuit 4 of the terminal generally communicates with different input/output circuits (keyboard, screen, means of transmission to a provider, etc.) and/or processing circuits, not shown. The circuits of the read/write terminal draw the power required by their operation from a supply circuit (not shown) connected, for example, to the electric supply system.

A transponder 10, intended for cooperating with a terminal 1, essentially includes an inductance L2, in parallel with a capacitor C2 between two input terminals 11, 12 of a circuit 13 of control and processing of transponder 10. Terminals 11, 12 are, in practice, connected to the input of a rectifying means (not shown), the outputs of which define D.C. supply terminals of the circuits internal to the transponder. In FIG. 1, the load formed of the circuits of transponder 10 on the oscillating circuit have been modeled by a resistor R2, shown in dotted lines, in parallel with inductance L2 and capacitor C2.

The oscillating circuit of terminal 1 is excited by a high-frequency signal (for example, 13.56 MHz) intended for being sensed by a transponder 10. When transponder 10 is in the field of terminal 1, a high-frequency voltage is generated across terminals 11, 12 of the transponder's resonant circuit. This voltage, after being rectified, is intended for providing the supply voltage of electronic circuits 13 of the transponder. These circuits generally essentially include a microprocessor, a memory, a demodulator of the signals possibly received from terminal 1, and a modulator for transmitting information to the terminal.

The data transmission from transponder 10 to terminal 1 is generally performed by modifying the load of oscillating circuit L2, C2, so that the transponder draws a lesser or greater amount of power from the high-frequency magnetic field. This variation is detected, on the side of terminal 1, because the amplitude of the high-frequency excitation signal is maintained constant. Accordingly, a power variation of the transponder translates as a variation of the current amplitude and phase in antenna L1. This variation is then detected, for example, by a measurement of the signal of terminal 5, either by means of a phase demodulator, or by means of an amplitude demodulator. The load variation on the transponder side is generally performed by means of an electronic switch for controlling a resistor or a capacitor modifying the load of the oscillating circuit. The electronic switch is generally controlled at a so-called sub-carrier frequency (for example, 847.5 kHz), much smaller (generally with a ratio of at least 10) than the frequency of the excitation signal of the oscillating circuit of terminal 1.

In the case of a phase demodulation by terminal 1, its modulator detects, in the sub-carrier half-periods when the electronic switch of the transponder is closed, a slight phase shift (by a few degrees, or even less than one degree) of the high-frequency carrier with respect to a reference signal. The demodulator output then provides a signal that is an image of the control signal of the electronic switch of the transponder, which can be decoded to restore the transmitted binary data.

To obtain a proper operation of the system, the oscillating circuits of terminal 1 and of transponder 10 are generally tuned on the carrier frequency, that is, their resonance frequency is set, for example, to the 13.56-MHz frequency. This tuning aims at maximizing the power transfer to the transponder, generally, a card of credit card size integrating the different transponder components.

The fields of application of electromagnetic transponders (for example, electronic purses, prepaid pass cards, etc.) may make it desirable to guarantee that a transponder only operates in a predetermined distance relation with a read/write terminal, more specifically, in extreme proximity, that is, in a relation generally defined by a distance smaller than 1 cm separating the respective antennas of the transponder and of the read/write terminal.

For example, in applications such as an electronic purse, the transaction security must be guaranteed, and pirates must then be unable to place a parasitic read terminal in the vicinity of an authorized terminal to intercept the information from the transponders using this authorized terminal. In this case, it must be guaranteed that a transponder will only operate in a relation of extreme proximity with the terminal.

However, in conventional systems, the remote supply of the transponders exhibits a gap, that is, a loss of remote supply power when the transponder is very close to the terminal. Among current solutions to solve this problem, a minimum interval is generally forced between antennas L1 and L2, for example by interposing a block between antenna L1 and the surface of the package before which the transponder is to pass. A disadvantage of this solution is that the coupling then no longer really corresponds to an extreme proximity, which makes the system particularly vulnerable to piracy by leaving a greater available range to the pirate.

Another known solution is, for an operation in extreme proximity, to increase the back-modulation resistance of the transponder. The aim then is to make the back modulation invisible by the terminal if the transponder is too far, the load variation becoming impossible to detect by the terminal demodulator. A disadvantage of this solution is that, in case a pirate terminal has been designed to be able to provide a sufficient power and to be provided with a very sensitive demodulator, the transponder is then visible, even from far away, by this pirate terminal.

SUMMARY OF THE INVENTION

The present invention aims at providing a solution to the need for operation in extreme proximity of electromagnetic transponder systems.

The present invention aims, in particular, at providing a solution that enables structurally dedicating a transponder and/or a terminal to an operation in extreme proximity.

More generally, the present invention aims at providing a solution that enables structurally dedicating a transponder and/or a terminal to an operation in a relation where the antennas are at a distance smaller than a predetermined value from each other.

The present invention also aims at providing a solution that is particularly simple to implement for the manufacturer and that is reliable in time.

To achieve these and other objects, the present invention provides an electromagnetic transponder of the type including a parallel oscillating circuit adapted to being excited by a series oscillating circuit of a read/write terminal when the transponder enters the field of the terminal, wherein the components of the oscillating circuit of the transponder are sized so that the coupling coefficient between the respective oscillating circuits of the terminal and of the transponder rapidly decreases when the distance separating the transponder from the terminal becomes greater than a predetermined value.

According to an embodiment of the present invention, the predetermined value corresponds to 1 centimeter.

According to an embodiment of the present invention, the oscillating circuit of the transponder has no capacitor, the stray capacitance of the inductance performing the function of the capacitive element for the oscillating circuit.

According to an embodiment of the present invention, an inductance of the parallel oscillating circuit is increased or maximized, a capacitance of this oscillating circuit being decreased or minimized.

According to an embodiment of the present invention, inductance L2 of the parallel oscillating circuit is chosen so that the following relation is respected:

$$kopt = \sqrt{\frac{R1L2}{R2L1}},$$

where kopt represents the coupling coefficient providing a maximum voltage across the parallel oscillating circuit, where R1 represents the series resistance of the series oscillating circuit, where R2 represents the equivalent resistance of the transponder brought in parallel on inductance L2, and where L1 represents the inductance of the series oscillating circuit.

According to an embodiment of the present invention, the components of the oscillating circuit of the transponder are sized based on an operating point at a zero distance, chosen to correspond to a coupling coefficient smaller than an optimal coupling coefficient respecting the following relation:

$$V2\mathrm{max}(kopt) = \sqrt{\frac{R2}{R1}} \frac{Vg}{2},$$

where V2max represents the voltage across the parallel oscillating circuit for the optimal coupling between the oscillating circuits, where R1 represents the series resistance of the series oscillating circuit, where R2 represents the equivalent resistance of the transponder brought in parallel on its oscillating circuit, and where Vg represents the excitation voltage of the series oscillating circuit.

According to an embodiment of the present invention, the number of turns of the inductance of the oscillating circuit of the transponder ranges between 5 and 15.

According to an embodiment of the present invention, the respective values of the capacitance and of the inductance of the parallel oscillating circuit range between 5 and 100 pf and between 2 and 25 µH.

The present invention also provides a terminal for generating an electromagnetic field adapted to cooperating with at least one transponder when said transponder enters this field, including a series oscillating circuit for generating the electromagnetic field, this series oscillating circuit being sized so that the coupling coefficient between the respective oscillating circuits of the terminal and of the transponder strongly decreases when the distance separating the transponder from the terminal becomes greater than a predetermined value.

According to an embodiment of the present invention, the components of the oscillating circuit of the terminal are sized to fulfill the operating conditions of the transponder.

According to an embodiment of the present invention, the inductance of the terminal's series oscillating circuit includes a single turn.

The present invention further relates to a system of contactless electromagnetic transmission between a terminal and a transponder.

The foregoing objects, features and advantages of the present invention, will be discussed in detail in the following non-limiting description of specific embodiments in connection with the accompanying drawings.

DETAILED DESCRIPTION

Figure 1:
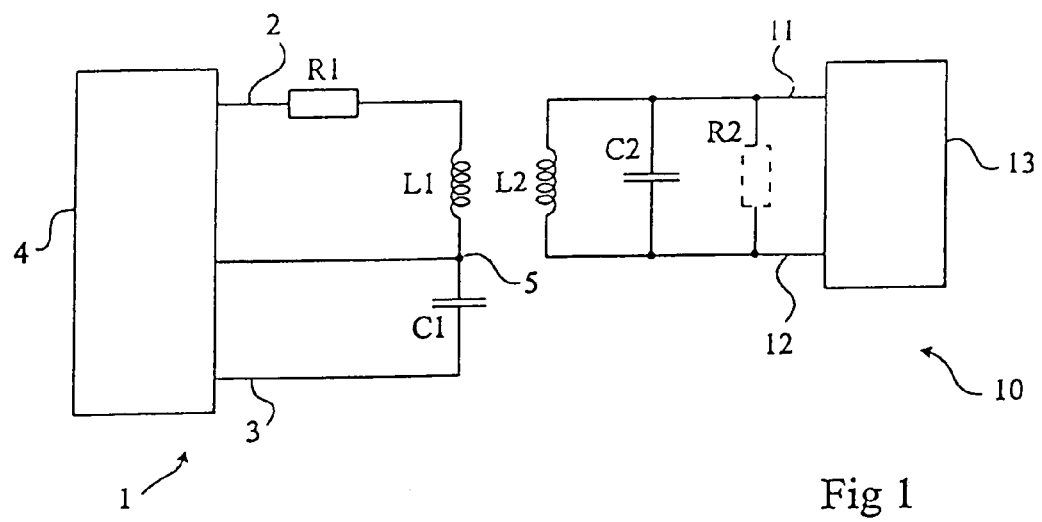
FIG. 1, previously described, very schematically shows a read/write terminal and an electromagnetic transponder of the type to which the present invention applies.

For clarity, only those elements necessary to the understanding of the present invention have been shown in the drawings and will be described hereafter. In particular, the circuit for controlling and exploiting the oscillating circuits of the transponder and of the terminal have not been detailed.

A feature of the present invention is to provide a specific sizing of the oscillating circuit of an electromagnetic transponder so that said transponder is structurally dedicated to an operation in which it is at a distance smaller than a predetermined value from a read/write terminal, preferably, in extreme proximity, that is, at less than 1 cm.

The notion of distance to which the present invention refers is the distance separating respective antennas L1, L2 (FIG. 1) of a transponder 10 and of a terminal 1.

The present invention thus provides placing, preferably by respective sizings of the oscillating circuits of the transponder and of the antenna, the system operating point to guarantee the desired range operation at the tuning frequency, that is, when the resonance frequencies of the oscillating circuit substantially correspond to the remote supply carrier frequency (for example, 13.56 MHz).

Figure 2:
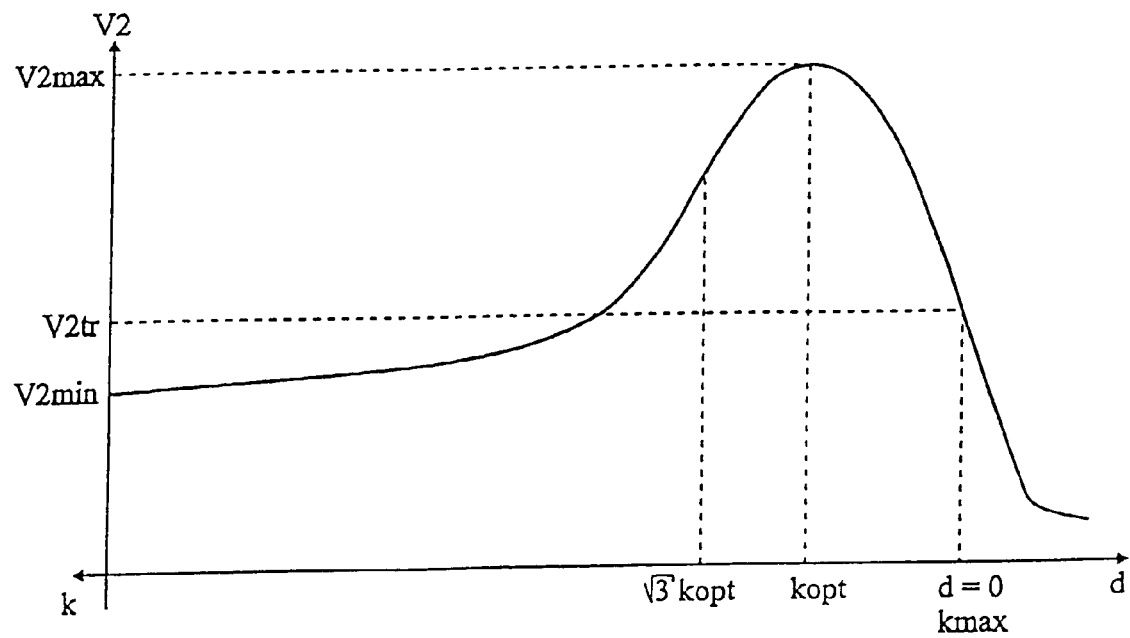
FIG. 2 shows an example of variation of the voltage across the oscillating circuit of a transponder according to the distance separating it from a terminal.

FIG. 2 shows the variation of voltage V2 across terminals 11, 12 of the transponder according to distance d separating the transponder from a read/write terminal.

The curve of FIG. 2 can also be considered as showing the variation of voltage V2 according to coupling coefficient k between the oscillating circuits of the transponder and of the terminal. Indeed, the coupling between the oscillating circuits is a function of the distance separating the antennas. More specifically, coupling coefficient k is, as a first approximation, proportional to 1−d. Accordingly, in the following description, reference will be made either to distance or to the coupling coefficient as the abscissa of the characteristic of FIG. 2. The x-axis represents a distance d increasing towards the right of the drawing and a coupling coefficient k increasing towards the left of the drawing.

Voltage V2 exhibits a maximum V2max for an optimal value of coupling coefficient kopt. This value corresponds to the smallest distance separating the two antennas for which voltage V2 is maximum when the frequency corresponds to the resonance frequency of the oscillating circuits. This value corresponds, according to the present invention, to a short distance. For a given frequency and sizing determining the operating conditions, voltage V2 decreases on either side of the optimal coupling position.

The curve exhibits a reversal point for a coupling value of kopt√3, that is, for a distance smaller than the optimal coupling position. On the smaller distance side, the curve tends towards an asymptote at a minimum voltage position V2min. On the greater distance side at the optimal coupling position, the decrease of voltage V2 is stronger.

The relation between optimal coupling coefficient kopt and the components of the oscillating circuits is the following:

$$kopt = \sqrt{\frac{R1L2}{R2L1}}.$$

A coupling coefficient k equal to one corresponds to the theoretical limiting value. Accordingly, coefficient kopt is, in practice, always smaller than 1.

More generally, coupling coefficient k is provided by formula $k=m/\sqrt{L1L2}$, where m represents the mutual inductance between the oscillating circuits. This mutual inductance essentially depends on the geometry of antennas or inductances L1 and L2.

A feature of the present invention is to determine, by means of the respective values of the oscillating circuit components, a distance operating point such that moving away from this operating point strongly decreases the coupling between the oscillating circuits.

Thus, for an operation in extreme proximity, the oscillating circuits will be sized so that optimal coupling coefficient kopt is as much as possible to the left of the drawing, that is, towards small distances. Since this optimal coupling is theoretical and inaccessible in practice, two possibilities for placing the real operating point are then available in terms of coupling and distance, by the sizing of the oscillating circuits.

According to the present invention, the zero distance point will be chosen to correspond, while being as close as possible to the optimal coupling point, to a coupling coefficient smaller than the optimal coefficient and adapted to the minimum voltage V2tr required for a proper transponder operation. This amounts to placing an operating point at a zero distance to the right of the optimal coupling position on FIG. 2. This point corresponds to a real maximum coupling kmax. Coefficient kmax depends on the respective geometries of antennas L1 and L2 and is, of course, included between 0 and 1. In practice, it should be noted that the real maximum coupling coefficient kmax between two oscillating circuits generally does not exceed 0.7.

An advantage then is to be located in the portion of the voltage-distance characteristic having a steep slope. Thus, as soon as the distance moves away from the operating point by the increase of the interval between the two oscillating circuits, the coupling coefficient strongly decreases so that the transponder is then no longer supplied. It should of course be noted that, since the distance cannot be negative, the determined operation point then is the point for which the coupling is maximum in the system configuration.

Preferably, the real maximum coupling point will be chosen so that the corresponding voltage V2 (V2(kmax)) is slightly greater than the minimum operating voltage V2tr of the transponder. For simplification, level V2tr has been indicated for coupling position kmax in FIG. 2. As a specific example of embodiment if voltage V2tr is 5 volts for a coefficient kmax of 0.2, voltage V2 becomes 2.5 volts for a coefficient k of 0.1.

Preferably, the highest possible value of inductance L2 of transponder 10 is chosen to have, at the resonance frequency (13.56 MHz), the smallest possible capacitance C2, for example on the order of some ten picofarads.

An advantage of such an embodiment is that capacitor C2 thus is easier to integrate.

Another advantage is that the reactive currents, which are a source of dissipation in transponder 10, are thus decreased.

It should be noted that, while in conventional systems the value of inductance L2 of the transponder is desired to be increased to increase the system range, the present invention conversely provides to increase this inductance to reduce or minimize the range, to obtain a dedicated operation in extreme proximity.

Searching the greatest possible inductance L2 goes along with searching the highest possible coupling for the zero distance. Similarly, it will be desired to reduce or minimize the value of equivalent resistance R2, still for increasing the coupling coefficient in extreme proximity.

It should be noted that the search for the greatest possible inductance L2 corresponds to an increase of the number of turns of this inductance (for example, of the number of conductive turns in antenna L2 formed on the chip card forming the transponder). This increase of the number of turns increases the parasitic resistance of inductance L2. However, the increase of the parasitic series resistance corresponds, brought in parallel on the oscillating circuit, to a decrease of resistance R2. This is thus favorable to decrease resistance R2.

An advantage of reducing or minimizing the value of capacitor C2 is that this decreases the quality factor of the transponder. Indeed, the quality factor of a parallel resonant circuit is equal to ωR2C2, where c represents the pulse of the oscillating circuit. Now, the lower the quality factor, the more the data rate can be increased between the transponder and the terminal.

A data-rate increase improves the system security with respect to a pirate read terminal. Indeed, a pirate reader will have to have a high quality factor to attempt to intercept the information coming from the transponder while it will not be in extreme proximity therewith. Having a high quality factor, the pirate reader will not be able to read the information with a high data-rate and, accordingly, will be inefficient.

Further, decreasing the quality factor on the transponder side discards the problem of the remote supply gap in conventional systems in extreme proximity. Indeed, the operation then is closer to that of a transformer.

A feature of a preferred embodiment of the present invention is, to reduce or minimize the value of capacitance C2, to eliminate the use of a capacitor in parallel on inductance L2 and to have the stray capacitance of the inductance perform the function of this capacitor. The present inventors have indeed acknowledged that this stray capacitance is the minimum value and that this minimum value varies little with the variations of the number of turns of the inductance. Accordingly, the inductance can then be sized so that its natural resonance frequency corresponds to the frequency of its carrier. For example, for a transponder of credit card size, an antenna of 10 turns on the card provides an inductance on the order of 13.5 μH, with a stray capacitance of some ten picofarads. An advantage of this embodiment is that the surface area required to form the capacitor is saved. Further, any reactive current is then eliminated.

According to a preferred embodiment of the present invention, the respective values of the different components are determined as follows.

First, the application and the energetic needs of the transponder determine voltage V2*tr* to be obtained by remote supply. For a given excitation voltage Vg of the oscillating circuit of the terminal, the voltage V2 recovered by the transponder is a function of the respective values of series resistance R1 of the terminal and of equivalent resistance R2 of the transponder in parallel on its oscillating circuit. The value of resistance R2 can be evaluated based on the transponder components (microprocessor, regulator, etc.) that determine the remote supply need to be maintained.

At theoretical optimal coupling point kopt, voltage V2max is provided by the following relation:

$$V2\text{max}(kopt) = \sqrt{\frac{R2}{R1}} \frac{Vg}{2}.$$

More generally, the relation linking voltage V2 to coupling coefficient k can be written as:

$$V2(k) = \frac{kR2Vg\sqrt{\frac{L1}{L2}}}{R1 + k^2\frac{L1}{L2}R2}.$$

After determining the voltage V2 to be obtained across capacitor C2, capacitor C2 is sized to the smallest possible value to ease its integration.

Then, inductance L2 of the oscillating circuit is determined according to the desired resonance frequency, based on the relation:

$$L2 = \frac{1}{C2\omega^2}.$$

Knowing inductance L2, the value to be given to the inductance of antenna L1 of the terminal to optimize the system can be determined. The relation linking these two values for the curve of FIG. 2 to be respected is, at the tuning, that is, for a sizing setting the resonance frequency to the remote supply carrier frequency:

$$L1 = \frac{R1L2}{R2k^2}.$$

Preferably, the value of inductance L1 is chosen to be as small as possible, that is, by minimizing its number of turns. Thus, according to the present invention, the number of turns of the terminal is relatively small, preferably 1, and the number of turns of the transponder is relatively high, preferably between 5 and 15 for a credit card format.

Preferably, a transponder of the present invention uses a single-halfwave rectification of voltage V2. Indeed, since the system of the present invention is provided to operate at a smaller range, the required power is also smaller.

Preferably, the terminal will be provided with a resistance R1 as high as possible to obtain an optimal coupling (smaller than or equal to 1) at the shortest possible distance.

As a specific example of embodiment, for a 13.56-MHz carrier frequency and for a value of 10 picofarads for capacitor C2, an antenna L2 having an inductance of approximately 13.5 microhenrys will be used. If the transponder's microprocessor requires a minimum voltage on the order of 4 volts to operate, a voltage V2 of approximately 5 volts will be chosen for a null distance position. The preferred ranges of values are, for example, a capacitor C2 of given value included between 5 and 100 picofarads and an inductance L2 of given value included between 2 and 25 microhenrys.

It should be noted that the fact of structurally determining the respective values of the components of the oscillating circuits of the terminal and the transponder is not disturbing. Indeed, in most applications, a given transponder type is dedicated to a terminal. In particular, the operating characteristics of electromagnetic transponder systems are generally submitted to standards. Accordingly, it is not disturbing to definitively determine the relations between the oscillating circuits of a terminal and of a transponder. Conversely, this is an advantage of the present invention since risks of unauthorized intervention on the transponder for piracy are thus avoided.

An advantage of the present invention is that it enables forming transponders and systems dedicated to an operation in extreme proximity.

Another advantage of the present invention is that it fulfils the strictest requirements to avoid the piracy of a transponder.

Of course, the present invention is likely to have various alterations, modifications, and improvements which will readily occur to those skilled in the art. In particular, the choice of the values of the components of the oscillating circuits is within the abilities of those skilled in the art based on the functional indications and on the relations given hereabove, according to the application and, in particular, to the carrier frequency on which these oscillating circuits are to be tuned. Further, it should be noted that the present invention does not alter the respective operations of the transponder and of the terminal as concerns the digital processing circuits.

Among the applications of the present invention are readers (for example, access control terminals or porticoes, automatic dispensers, computer terminals, telephone terminals, televisions or satellite decoders, etc.) of contactless chip cards (for example, identification cards for access control, electronic purse cards, cards for storing information about the card holder, consumer fidelity cards, toll television cards, etc.), as well as such chip cards.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An electromagnetic transponder including a parallel oscillating circuit adapted to being excited by a series oscillating circuit of a read/write terminal when the electromagnetic transponder enters the field of the read/write terminal, wherein components of the parallel oscillating circuit of the transponder are sized based on a predetermined distance so that a coupling coefficient between respective oscillating circuits of the read/write terminal and of the electromagnetic transponder rapidly decreases when a distance separating the electromagnetic transponder from the read/write terminal becomes greater than the predetermined distance, wherein an inductance of the parallel oscillating circuit is chosen in accordance with the following relation:

$$kopt = \sqrt{\frac{R1 L2}{R2 L1}},$$

where kopt is a coupling coefficient providing a maximum voltage across the parallel oscillating circuit, R1 is a series resistance of the series oscillating circuit, R2 is an equivalent resistance of the transponder parallel to an inductance L2 of the transponder, and L1 is an inductance of the series oscillating circuit.

2. The electromagnetic transponder of claim 1, wherein the predetermined distance corresponds to 1 centimeter.

3. The electromagnetic transponder of claim 1, wherein a capacitive element of the parallel oscillating circuit is provided by a stray capacitance of an inductance of the parallel oscillating circuit.

4. The electromagnetic transponder of claim 1, wherein inductance of the parallel oscillating circuit is maximized, a capacitance of this oscillating circuit being minimized.

5. The electromagnetic transponder of claim 1, wherein the components of the parallel oscillating circuit of the transponder are sized based on an operating point at a zero distance, chosen to correspond to a coupling coefficient smaller than an optimal coupling coefficient in accordance with the following relation:

$$V2\max(kopt) = \sqrt{\frac{R2}{R1}} \frac{Vg}{2},$$

where V2max is a voltage across the parallel oscillating circuit for optimal coupling between the parallel and series oscillating circuits and Vg is an excitation voltage of the series oscillating circuit.

6. The electromagnetic transponder of claim 1, wherein a number of turns of an inductance of the parallel oscillating circuit of the transponder is in a range of between 5 and 15.

7. The electromagnetic transponder of claim 1, wherein respective values of a capacitance and of an inductance of the parallel oscillating circuit range between 5 and 100 pf and between 2 and 25 µH.

8. A system of contactless electromagnetic transmission between a terminal and a transponder, wherein the transponder is that of claim 1.

9. A terminal for generating an electromagnetic field adapted to cooperate with at least one transponder when said at least one transponder enters the electromagnetic field, including a series oscillating circuit for generating the electromagnetic field, the series oscillating circuit being sized based on a predetermined distance so that a coupling coefficient between the series oscillating circuit of the terminal and an oscillating circuit of the at least one transponder strongly decreases when a distance separating the at least one transponder from the terminal becomes greater than the predetermined distance, wherein an inductance of the series oscillating circuit is chosen in accordance with the following relation:

$$kopt = \sqrt{\frac{R1 L2}{R2 L1}},$$

where kopt is a coupling coefficient providing a maximum voltage across the oscillating circuit of the at least one transponder, R1 is a series resistance of the series oscillating circuit, R2 is an equivalent resistance of the at least one transponder parallel to an inductance L2 of the at least one transponder, and L1 is an inductance of the series oscillating circuit.

10. The terminal of claim 9, wherein the oscillating circuit of the transponder is a parallel oscillating circuit adapted to being excited by the series oscillating circuit of the terminal when the transponder enters the electromagnetic field, and wherein components of the series oscillating circuit are sized to fulfill operating conditions of the transponder.

11. The terminal of claim 10, wherein an inductance of the series oscillating circuit includes a single turn.

12. A system of contactless electromagnetic transmission between a terminal and a transponder, wherein the terminal is that of claim 9.

13. The terminal of claim 9, wherein one or more components of the series oscillating circuit of the transponder are sized based on an operating point at a zero distance, chosen to correspond to a coupling coefficient smaller than an optimal coupling coefficient in accordance with the following relation:

$$V2\max(kopt) = \sqrt{\frac{R2}{R1}} \frac{Vg}{2},$$

where V2max is a voltage across the oscillating circuit of the at least one transponder for optimal coupling between the series oscillating circuit and the oscillating circuit of the at least one transponder and Vg is an excitation voltage of the series oscillating circuit.

14. A transponder comprising:
an oscillating circuit adapted to be excited by an external electromagnetic field when the transponder enters the electromagnetic field, the oscillating circuit including an inductance, and wherein a stray capacitance of the inductance acts as a capacitive element for the oscillating circuit,
wherein components of the oscillating circuit are sized based on a particular distance, which serves as an operating point between the transponder and the terminal, to produce an operating condition in which a coupling coefficient between the transponder and a read/write terminal that generates the electromagnetic field rapidly decreases when a distance separating the transponder from the read/write terminal becomes greater than the particular distance,
wherein the components of the oscillating circuit are sized based on an operating point at a zero distance, chosen to correspond to a coupling coefficient smaller than an optimal coupling coefficient in accordance with the following relation:

$$V2\max(kopt) = \sqrt{\frac{R2}{R1}} \frac{Vg}{2},$$

where V2max is a voltage across the oscillating circuit for optimal coupling between the oscillating circuit and an oscillating circuit of the read/write terminal, R1 is a series resistance of the oscillating circuit of the read/write terminal, R2 is an equivalent resistance of the transponder parallel to the oscillating circuit of the transponder, and Vg is an excitation voltage of the oscillating circuit of the read/write terminal.

15. The transponder of claim 14, wherein the particular distance corresponds to approximately 1 centimeter.

16. A system for data transfer comprising:
a terminal including a series oscillating circuit having a first inductive element and a first capacitive element; and
a transponder including a parallel oscillating circuit having a second inductive element and a second capacitive element;
wherein the first and second inductive elements and first and second capacitive elements are sized based on a particular distance, which serves as an operating point between the transponder and the terminal, to produce an operating condition in which a coupling coefficient between the series oscillating circuit and the parallel oscillating circuit decreases rapidly when a distance between the terminal and the transponder is greater than the particular distance,
wherein the first inductive element and/or the second inductive element is chosen in accordance with the following relation:

$$kopt = \sqrt{\frac{R1 L2}{R2 L1}},$$

where kopt is a coupling coefficient providing a maximum voltage across the parallel oscillating circuit, R1 is a series resistance of the series oscillating circuit, R2 is an equivalent resistance of the transponder parallel to the second inductive element having an inductance L2, and L1 is an inductance of the first inductive element.

17. The system for data transfer of claim 16, wherein the second capacitive element is provided by a stray capacitance of the second inductive element.

18. The system for data transfer of claim 16, wherein the particular distance is approximately 1 centimeter.

19. The system for data transfer of claim 16, wherein the first inductive element comprises a single turn.

20. A system for data transfer comprising:
a terminal including a series oscillating circuit having a first inductive element and a first capacitive element; and
a transponder including a parallel oscillating circuit having a second inductive element and a second capacitive element;
wherein the first and second inductive elements and first and second capacitive elements are sized based on a particular distance, which serves as an operating point between the transponder and the terminal, to produce an operating condition in which a coupling coefficient between the series oscillating circuit and the parallel oscillating circuit decreases rapidly when a distance between the terminal and the transponder is greater than the particular distance,
wherein at least one of the following elements: the first and second inductive elements and first and second capacitive elements, are sized based on an operating point at a zero distance, chosen to correspond to a coupling coefficient smaller than an optimal coupling coefficient in accordance with the following relation:

$$V2\max(kopt) = \sqrt{\frac{R2}{R1}} \frac{Vg}{2},$$

where V2max is a voltage across the parallel oscillating circuit for optimal coupling between the parallel and series oscillating circuits, R1 is a series resistance of the series oscillating circuit, R2 is an equivalent resistance of the transponder parallel to the parallel oscillating circuit, and Vg is an excitation voltage of the series oscillating circuit.

21. An electromagnetic transponder including a parallel oscillating circuit adapted to being excited by a series oscillating circuit of a read/write terminal when the electromagnetic transponder enters the field of the read/write terminal, wherein one or more components of the parallel oscillating circuit of the transponder are sized based on a particular distance so that a coupling coefficient between respective oscillating circuits of the read/write terminal and of the electromagnetic transponder rapidly decreases when a distance separating the electromagnetic transponder from the read/write terminal becomes greater than the particular distance, wherein the components of the parallel oscillating circuit of the transponder are sized based on an operating point at a zero distance, chosen to correspond to a coupling coefficient smaller than an optimal coupling coefficient in accordance with the following relation:

$$V2\max(kopt) = \sqrt{\frac{R2}{R1}} \frac{Vg}{2},$$

where V2max is a voltage across the parallel oscillating circuit for optimal coupling between the parallel and series oscillating circuits, R1 is a series resistance of the series oscillating circuit, R2 is an equivalent resistance of the transponder parallel to the parallel oscillating circuit, and Vg is an excitation voltage of the series oscillating circuit.

22. The electromagnetic transponder of claim 21, wherein the particular distance corresponds to 1 centimeter.

23. The electromagnetic transponder of claim 21, wherein a capacitive element of the parallel oscillating circuit is provided by a stray capacitance of an inductance of the parallel oscillating circuit.

24. The electromagnetic transponder of claim 21, wherein inductance of the parallel oscillating circuit is maximized, a capacitance of this oscillating circuit being minimized.

25. The electromagnetic transponder of claim 21, wherein a number of turns of an inductance of the parallel oscillating circuit of the transponder is in a range of between 5 and 15.

26. The electromagnetic transponder of claim 21, wherein respective values of a capacitance and of an inductance of the parallel oscillating circuit range between 5 and 100 pf and between 2 and 25 µH.

27. A terminal for generating an electromagnetic field adapted to cooperate with at least one transponder when said transponder enters the electromagnetic field, including a series oscillating circuit for generating the electromagnetic field, one or more components of the series oscillating circuit being sized based on a particular distance so that a coupling coefficient between the series oscillating circuit and an oscillating circuit of the at least one transponder strongly decreases when a distance separating the at least one transponder from the terminal becomes greater than the particular distance, wherein one or more components of the series oscillating circuit of the transponder are sized based on an operating point at a zero distance, chosen to correspond to a coupling coefficient smaller than an optimal coupling coefficient in accordance with the following relation:

$$V2\max(kopt) = \sqrt{\frac{R2}{R1}} \frac{Vg}{2},$$

where V2max is a voltage across the oscillating circuit of the at least one transponder for optimal coupling between the and series oscillating circuits, R1 is a series resistance of the series oscillating circuit, R2 is an equivalent resistance of the transponder parallel to the oscillating circuit of the at least one transponder, and Vg is an excitation voltage of the series oscillating circuit.

28. The terminal of claim 27, wherein the oscillating circuit of the transponder is a parallel oscillating circuit adapted to being excited by the series oscillating circuit of the terminal when the transponder enters the electromagnetic field, and wherein components of the series oscillating circuit are sized to fulfill operating conditions of the transponder.

29. The terminal of claim 28, wherein an inductance of the series oscillating circuit includes a single turn.

30. A transponder comprising:

an oscillating circuit adapted to be excited by an external electromagnetic field when the transponder enters the electromagnetic field, the oscillating circuit including an inductance, and wherein a stray capacitance of the inductance acts as a capacitive element for the oscillating circuit, wherein components of the oscillating circuit are sized based on a particular distance, which serves as an operating point between the transponder and the terminal, to produce an operating condition in which a coupling coefficient between the transponder and a read/write terminal that generates the electromagnetic field rapidly decreases when a distance separating the transponder from the read/write terminal becomes greater than the particular distance, wherein the inductance of the oscillating circuit is chosen in accordance with the following relation:

$$kopt = \sqrt{\frac{R1L2}{R2L1}},$$

where kopt is a coupling coefficient providing a maximum voltage across the oscillating circuit, R1 is a series resistance of an oscillating circuit of the read/write terminal, R2 is an equivalent resistance of the transponder parallel to an inductance L2 of the oscillating circuit, and L1 is an inductance of an oscillating circuit of the read/write terminal.

* * * * *